(12) United States Patent
Nonnenbroich et al.

(10) Patent No.: US 9,908,414 B2
(45) Date of Patent: Mar. 6, 2018

(54) RETAINER FOR A DISPLAY DEVICE TO BE RETAINED IN A MOTOR VEHICLE

(71) Applicant: AUDI AG, Ingolstadt (DE)

(72) Inventors: Klaus Nonnenbroich, Reichertshofen (DE); Robert Haumer, Neustadt (DE)

(73) Assignee: AUDI AG, Ingolstadt (DE)

( * ) Notice: Subject to any disclaimer, the term of this patent is extended or adjusted under 35 U.S.C. 154(b) by 44 days.

(21) Appl. No.: 14/784,806

(22) PCT Filed: Mar. 21, 2014

(86) PCT No.: PCT/EP2014/000770
§ 371 (c)(1),
(2) Date: Feb. 8, 2016

(87) PCT Pub. No.: WO2014/169986
PCT Pub. Date: Oct. 23, 2014

(65) Prior Publication Data
US 2016/0176291 A1 Jun. 23, 2016

(30) Foreign Application Priority Data
Apr. 16, 2013 (DE) .......................... 10 2013 006 557

(51) Int. Cl.
B60K 35/00 (2006.01)
B60K 37/00 (2006.01)
(Continued)

(52) U.S. Cl.
CPC .............. *B60K 35/00* (2013.01); *B60K 37/00* (2013.01); *B60K 37/04* (2013.01);
(Continued)

(58) Field of Classification Search
CPC ...... F16B 5/0233; F16B 5/025; F16B 5/0258; F16B 5/0275
(Continued)

(56) References Cited

U.S. PATENT DOCUMENTS 1,726,495 A * 8/1929 King ..................... G01F 23/162
248/27.1
3,018,127 A * 1/1962 Dobrosielski ............ F16J 13/18
220/327

(Continued)

FOREIGN PATENT DOCUMENTS

CN 104464538 3/2015
DE 36 44 049 6/1988
(Continued)

OTHER PUBLICATIONS

Chinese Search Report dated Feb. 22, 2017 with respect to counterpart Chinese patent application 201480034039.3.
(Continued)

*Primary Examiner* — Terrell L McKinnon
*Assistant Examiner* — Michael McDuffie
(74) *Attorney, Agent, or Firm* — Henry M. Feiereisen LLC

(57) ABSTRACT

The invention relates to a retainer (1) for a display device (3), which display device is to be retained in a motor vehicle, in particular in a motor-vehicle-side fitting, and in particular forms a part of a head-up display. The retainer comprises at least one support (5, 6) having at least one bearing device (8) for supporting the display device (3). The bearing device (8) can be positionally adjusted in relation to the support (5, 6) by means of an adjusting device (11) arranged on the support side. The adjusting device (11) has a setting element (12) that can be positionally adjusted in relation to the support (5, 6). The setting element has a first coupling segment (13) for coupling to the bearing device (8), wherein the first coupling segment (13) is provided with a first thread segment (16) on the circumference of the first coupling segment, and a second coupling segment (14) for coupling to the support (5, 6), wherein the second coupling segment (14) is provided with a second thread segment (17) on the circumference of
(Continued)

the second coupling segment, wherein the two thread segments (17, 18) have different thread pitches.

14 Claims, 5 Drawing Sheets

(51) Int. Cl.
*B60K 37/04* (2006.01)
*G02B 27/01* (2006.01)
(52) U.S. Cl.
CPC .... *G02B 27/0149* (2013.01); *B60K 2350/405* (2013.01); *B60K 2350/941* (2013.01)
(58) Field of Classification Search
USPC ....... 248/544, 686, 671, 670, 672, 674, 675, 248/27.1, 220.21, 222.14, 223.31, 223.41, 248/224.7, 224.8, 346.04; 81/484; 361/679.01, 679.02, 679.42–679.44, 361/679.21–679.3; 292/251; 411/389
See application file for complete search history.

(56) References Cited

U.S. PATENT DOCUMENTS

| | | | | |
|---|---|---|---|---|
| 3,343,581 A * | 9/1967 | Martin | ................... | F16B 5/0208 292/251 |
| 4,108,025 A | 8/1978 | Stine et al. | | |
| 4,157,674 A * | 6/1979 | Carlson | ................. | F16B 5/0275 411/324 |
| 4,915,557 A * | 4/1990 | Stafford | ................ | F16B 5/0208 292/251 |
| 5,333,978 A * | 8/1994 | Rives | ................... | B60Q 1/0433 411/369 |
| 5,609,454 A * | 3/1997 | Lee | ....................... | F16B 5/0275 411/384 |
| 7,259,958 B2 * | 8/2007 | Bang | .................... | H05K 5/0204 248/220.21 |
| 8,267,629 B2 * | 9/2012 | Bang | ....................... | F16M 11/22 411/109 |
| 8,434,983 B2 * | 5/2013 | Chen | ..................... | F16B 5/0208 411/347 |
| 8,567,728 B2 * | 10/2013 | Washiyama | ............. | B60R 11/02 248/200 |
| 8,770,902 B1 * | 7/2014 | Miller | ................... | F16B 5/0208 29/451 |
| 2003/0174463 A1 * | 9/2003 | Chen | ....................... | B60R 11/02 361/679.26 |
| 2003/0183730 A1 * | 10/2003 | Landes | ..................... | H05K 7/18 248/27.1 |
| 2010/0202856 A1 * | 8/2010 | Donovan | .............. | F16B 5/0208 411/546 |
| 2010/0230549 A1 * | 9/2010 | Probasco | ............. | H05K 5/0017 248/27.1 |
| 2010/0264276 A1 * | 10/2010 | Wippler | ............... | H05K 5/0204 248/27.1 |
| 2010/0307074 A1 * | 12/2010 | Stearns | ................... | E04D 13/10 52/173.1 |
| 2012/0160976 A1 * | 6/2012 | Ye | ........................ | H01L 23/4006 248/224.8 |
| 2012/0217361 A1 * | 8/2012 | Kuo | ......................... | H05K 7/142 248/222.13 |
| 2013/0170895 A1 * | 7/2013 | Tseng | ....................... | F16B 35/06 403/270 |
| 2015/0003930 A1 * | 1/2015 | Plickys | ................. | F16B 5/0275 411/326 |
| 2015/0117050 A1 * | 4/2015 | Burton | ................. | B60Q 1/2638 362/549 |
| 2015/0362121 A1 * | 12/2015 | Tseng | ................... | H05K 7/1401 248/544 |

FOREIGN PATENT DOCUMENTS

| | | |
|---|---|---|
| DE | 197 21 969 | 2/1999 |
| DE | 10 2011 118853 | 2/2013 |
| DE | 10 2011 115 531 | 4/2013 |
| WO | WO 01/33830 | 5/2001 |
| WO | WO 2004/011302 | 2/2004 |

OTHER PUBLICATIONS

Translation of Chinese Search Report dated Feb. 22, 2017 with respect to counterpart Chinese patent application 201480034039.3.
International Search Report issued by the European Patent Office in International Application PCT/EP2014/000770.
Chinese Search Report dated Jul. 26, 2017 with respect to counterpart Chinese patent application 201480034039.3.
Translation of Chinese Search Report dated Jul. 26, 2017 with respect to counterpart Chinese patent application 201480034039.3.

* cited by examiner

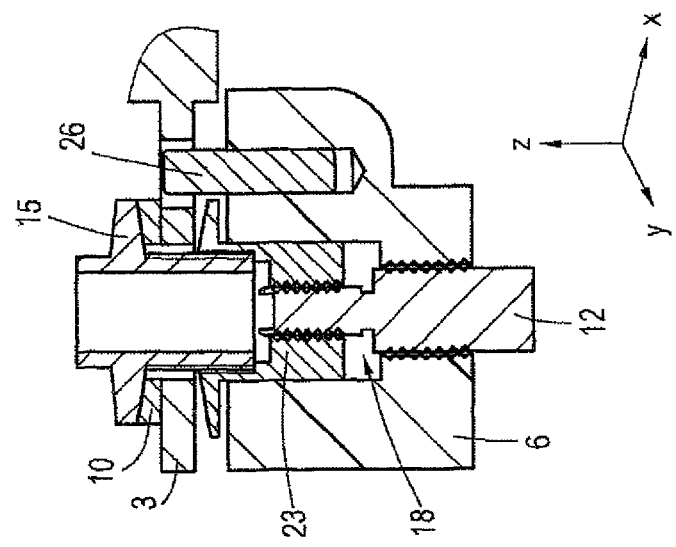
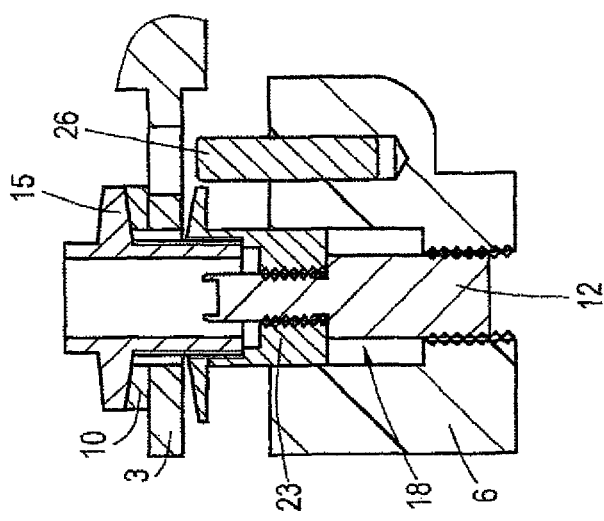
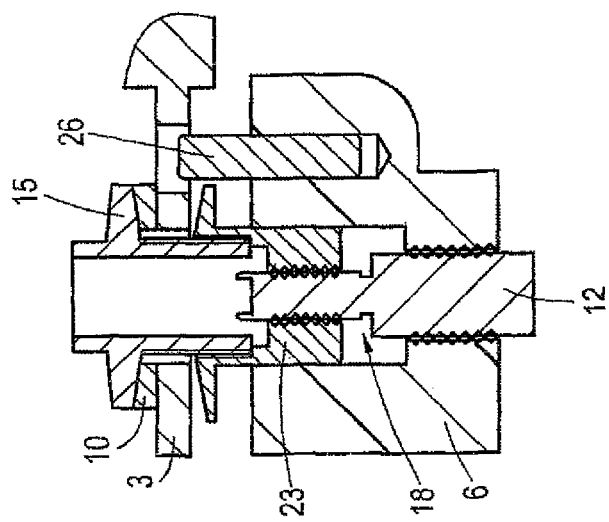

RETAINER FOR A DISPLAY DEVICE TO BE RETAINED IN A MOTOR VEHICLE

CROSS-REFERENCES TO RELATED APPLICATIONS

This application is the U.S. National Stage of International Application No. PCT/EP2014/000770, filed Mar. 21, 2014, which designated the United States and has been published as International Publication No. WO 2014/169986 and which claims the priority of German Patent Application, Serial No. 10 2013 006 557.7, filed Apr. 16, 2013, pursuant to 35 U.S.C. 119(a)-(d).

BACKGROUND OF THE INVENTION

The invention relates to a retainer for a display device to be retained in a motor vehicle, especially in a motor vehicle-side fitting, which in particular forms a part of a head-up display.

Such retainers are in themselves known in the art and are used to support or retain display devices, in particular display devices forming parts of a head-up display, which are usually arranged in fittings in the area of an instrument panel of a motor vehicle. Such supports must ensure stable and precise positioning of suitable display devices, in particular under different operating or running conditions of a motor vehicle, since this is essential for the proper operation of corresponding display devices. This is important in particular for the support of display devices that form parts of head-up displays. Moreover, respective retainers must make it possible to allow a very fine setting or adjustment of the position or orientation of corresponding display devices.

In particular, conventional retainers are primarily unsatisfactory because they do not exhibit the desired stability and adjustability with respect to the support of display devices.

SUMMARY OF THE INVENTION

The invention is thus based on the problem to provide an improved support for a display device, in particular a display device forming part of a head-up display, to be retained in a motor vehicle, in particular in a motor vehicle-side fitting.

The problem is solved according to the invention by a retainer of the aforementioned type, which includes at least one support with at least one bearing device for supporting the display device, wherein the position of the bearing device is adjustable relative to the support via an adjusting device arranged on the support side. The adjusting device has a setting element whose position relative to the support is adjustable by way of a first coupling segment for coupling with the support device, wherein the first coupling segment is circumferentially provided with a first thread segment, and with a second coupling segment for coupling to the support, wherein the second coupling segment is circumferentially provided with a second thread segment. The two thread segments have different thread pitches.

The retainer according to the invention has at least one support with at least one bearing device for supporting the display device. The support or the supports, if the retainer includes a plurality of supports, refer to component of the retainer to be joined with the body of a motor vehicle. The bearing device is used for supporting or actually retaining the display device.

The position of the bearing device, in particular its height, can be adjusted relative to the support by way of an adjusting device disposed in particular on the support side. The bearing device can therefore assume different positions in a vertical displacement direction with respect to the support to be fixedly mounted on a vehicle body. Likewise, the display device supported by the bearing device can assume or be positioned in a vertical direction of adjustment at different positions in relation to the support. The adjustment is used for the accurate positioning, in particular for fine setting or fine adjustment of the display device supported by the bearing device.

The adjusting device includes a setting element having a position adjustable relative to the support, i.e., in particular height-adjustable. The setting element is provided with two coupling segments. A first coupling segment is configured to couple the setting element with the bearing device. Thus, the first coupling segment establishes a direct or an indirect connection of the setting element with the bearing device. The first coupling segment is circumferentially provided with a first thread segment. A second coupling segment is configured to couple the setting element to the support. The second coupling segment thus establishes a direct or an indirect connection of the setting element with the support. The second coupling segment is circumferentially provided with a second thread segment. The thread segments provided at the respective setting element-side coupling segments have different thread pitches.

The thread segments with the different thread pitches enable a particularly precise fine adjustment of the height position (z-position) of the setting element, of the bearing device coupled thereto via the first coupling segment for the display device, and thus of the entire display device. Depending on the actual pitches of the respective thread segments, the difference therebetween produces the actual height adjustment of the setting element and of the components coupled thereto per rotation of the setting element.

The first thread segment may be, for example, a thread having a pitch of 0.8 mm per revolution (360° rotation) of the setting element, and the second thread segment may be a thread having a pitch of 1.25 mm per revolution of the setting element. The first thread segment may therefore be formed in this example as M5 thread according to the nomenclature for metric ISO threads, whereas the second thread segment in the example may then be formed as M8 thread according to the nomenclature for metric ISO threads. The difference in the thread pitches is in this case 0.45 mm per turn of the setting element. Of course, the respective thread segments may also have pitches other than the exemplary pitches.

The first and/or second thread segment provided on the setting element, i.e. in particular on the associated respective coupling segments, may be formed by a threaded insert clampingly surrounding the first and/or second coupling segment. Therefore, the setting element itself need not be provided with corresponding external threads, but suitable threaded inserts may instead be attached to the respective alternate setting element-side coupling segments. By clamping the threaded inserts on the respective coupling segments, the threaded inserts are connected to the setting element with a rotation lock. The threaded inserts are of course each designed so as to realize the different thread pitches on the setting element-side thread segments. The threaded inserts provided on the respective setting element-side coupling segments have different thread pitches.

The setting element is typically formed as a rotationally symmetrical component. The setting element can thus, for example, be designed as a spindle, wherein the first and the second coupling segment have different diameters and the diameter of the first coupling segment is smaller than the diameter of the second coupling segment. Accordingly, the setting element designed especially as a spindle has two different, axially adjacent diameters. The first coupling segment is disposed in the region of a first diameter, whereas the second coupling segment is disposed in the region of a second diameter. As mentioned above, the first thread segment may be formed as an M5 thread, i.e., as a thread with an outer diameter of 5 mm and a thread pitch of 0.8 mm per revolution of the setting element, and the second thread segment may be formed as an M8 thread, i.e. a thread with an outer diameter of 8 mm and a thread pitch of 1.25 mm per revolution of the setting element.

In a further development of the invention, a receiving area for the setting element may be formed in the support, wherein the first coupling segment of the setting element can be or is arranged in a first receiving region section with a first diameter, whereas the second coupling segment of the setting element can be or is arranged in a second receiving area section with a second diameter. The support-side receiving area may, for example, be a bore, especially a blind hole, or the like. The receiving area is divided into two axially adjacent receiving area sections. A first receiving area section located further outward with respect to the outer contour of the support is provided for the first coupling segment. A second receiving area located further inward with respect to the outer contour of the support is provided for the second coupling segment.

The receiving area sections may have different inner diameters. In particular, the second receiving area section for the second coupling segment may be provided with an inner diameter matching the outer diameter of the second coupling segment. The receiving area section for the first coupling segment has typically an inner diameter that is larger than the outer diameter of the first coupling segment. Likewise, additional components associated with the retainer according to the invention, in particular a coupling part to be described below, are or can be arranged in the first receiving area section in addition to the first coupling segment.

Alternatively, a sleeve element that can be inserted in the support, i.e. in a suitable support-side recess, may be provided which forms the support-side receiving area for the setting element. The sleeve element may be designed to have two receiving area sections. As above, the first coupling segment of the setting element may be or is arranged in a sleeve-element-side first receiving area section having a first diameter, whereas the second coupling segment of the setting element may be or is arranged in a sleeve-element-side second receiving area section having a second diameter.

The coupling of the setting element with the bearing device can in principle be implemented in two different ways. On the one hand, the first thread segment of the setting element may engage directly in a part of the bearing device, in particular with a counter-thread segment corresponding to the first thread segment, wherein the bearing device is mounted with a rotation lock. On the other hand, the first thread segment may engage in a part of a coupling part, in particular with a counter-thread segment corresponding to first thread segment, which is arranged between the first coupling segment and a part of the bearing device and which supports the bearing device, wherein the coupling part is mounted with a rotation lock.

In the first variant, a part of the bearing device, in particular a hollow cylindrical part, axially engages in the first receiving area section of the support-side receiving section. The bearing device is coupled with the first thread segment formed on first coupling segment of the setting element via a counter-thread segment provided on this part of the bearing device. The setting element is thus directly coupled to the bearing device or connected thereto. The bearing device is mounted with a rotation lock, i.e. it can in principle not be twisted around its longitudinal axis. In particular, the bearing device is connected with the support with a rotation lock. This can be realized, for example, by a rotation lock. The rotation lock may be formed, for example, by a pin protruding from the support, which engages in or passes through an opening provided in the bearing device. A rotation of the setting element causes an axial movement of the setting element relative to the support. The setting element is axially movable in particular within the support-side receiving area. The coupling of the setting element to the non-rotatably mounted part of the bearing device has the effect that the bearing device is forcibly moved axially upon rotation of the setting element, even when the setting element itself does not rotate. When the setting element moves, for example, into the support-side receiving section, the bearing device is also "drawn into" the support-side receiving area.

In the second variant, a coupling part, in particular a hollow cylindrical coupling part or a coupling having a hollow cylindrical section, engages axially in the first receiving area section of the support-end receiving section. A coupling or connection with the first thread segment formed at the first coupling segment of the setting element is established via counter-thread section provided on the coupling part. The coupling part supports the bearing device. Since the coupling part can be viewed as an intermediary between the setting element and the bearing device, the setting element in this variation is indirectly coupled to the bearing device via the coupling part. Like the bearing device in the first variant, the coupling part in this variant is non-rotatably mounted, i.e. the coupling part can in principle not be rotated about its longitudinal axis. In particular, the coupling part is non-rotationally connected with the support. This can be realized by, for example, a rotation lock. The rotation can be formed, similar to the first variant, for example by a bolt protruding from the support, which engages in or passes through an opening of the coupling part provided for this purpose for example on a flange section of the coupling part. The coupling of the setting element with the non-rotatably mounted coupling part forces the coupling part to move therewith axially upon rotation of the setting element, even if the coupling part itself does not rotate. When the setting element moves, for example, into the support-side receiving area, the coupling part is also "drawn into" the receiving area.

For both variants, the bearing device or the coupling part can be tensioned by axial movements of the setting element and the associated axial movements of the bearing device which, as mentioned above, occur directly or indirectly via the coupling part. The tensioning allows the bearing device and thus the display device to be arranged or positioned with a particularly stable orientation and/or position. The tensioning also causes a kind of self-locking of the bearing device in a position set by the setting element, which ensures that the bearing device does not leave its orientation or position set by the setting element.

For the described variants, the first thread segment engages in a cylindrical receiving space of the coupling part corresponding to the diameter of the first coupling segment, in particular a receiving space with a counter-thread segment corresponding to the first thread segment, and the second thread segment engages in a cylindrical receiving space of the support corresponding to the diameter of the second coupling segment, in particular a receiving space with a counter-thread segment corresponding to the second thread segment. Thus, the setting element engages by way of the first thread segment directly in a receiving space provided on the coupling part. The receiving space is dimensioned such that its inner diameter is adapted to the outer diameter of the first coupling segment of the setting element. The coupling segment-side receiving space may therefor be provided with a counter thread or female thread corresponding to the setting element-side first thread segment, so that the setting element can be or is screwed into the coupling part. Similarly, the setting element-side second thread segment may be screwed into a dedicated support-side receiving space. The support-side second receiving space is dimensioned such that its inner diameter is adapted to the outer diameter of the second coupling segment of the setting element. Furthermore, the support-side receiving space may have a counter thread or an internal thread corresponding to the setting element-side second thread segment, in which the second thread segment of the setting element can be or is screwed. The counter threads provided in the coupling part and the support, respectively, may also be formed by threaded inserts to be arranged or attached in the coupling part-side or the support-side receiving spaces.

When the setting element is coupled or connected via the coupling part to the bearing device, a receiving space for the setting element and the coupling part may be formed in the support, wherein the coupling part may be or is arranged in a first receiving area section with a first diameter and the second coupling segment of the setting element may be or is arranged in a first receiving area section in a second receiving area section with a second diameter. The support-side receiving area is thus divided into two sections. A first receiving area section serves to receive the coupling part and hence the first coupling segment of the setting element to be connected thereto. The inner diameter of the first receiving area section is typically adapted to the outer diameter of the coupling part. A second receiving area section serves to receive the second coupling segment of the setting element. In particular, the support-side second receiving area section includes the aforementioned support-side second receiving space. Accordingly, the second receiving space is typically delimited by the second receiving area section.

Advantageously, the bearing device has a bore, in particular a through-hole, which provides access to an exposed end face of the actuating means. It is then possible to insert a tool, in particular a screwdriver, by way of the bore provided in the bearing device which is advantageously axially aligned with the setting element arranged in the support, i.e. in a corresponding support-side receiving space, i.e. to place a tool against a slot, a Phillips, a Torx, etc. that forms a screw-head drive, or against a front end of the setting element having such a screw-head drive for transmitting torque to the setting element by moving the setting element for the purpose of fine adjustment, in particular the vertical z-position of the display device either farther out of the support or farther into the support. The setting element may therefore in all embodiments of the invention in principle be provided at the end face with a screw head drive.

For attachment of the support to a vehicle body, at least one attachment point, in particular in the form of a through hole, is advantageously formed in the support for connecting the support to a vehicle body. The support and hence the entire retainer of the invention can be connected with a vehicle body via the support-side connecting point typically constructed as a through-bore. Advantageously, three mutually offset connection points are provided on the support. A coarse adjustment of the position of the retainer and thus the display device can be made as part of the connection of the support to the vehicle body by suitably positioning of the attachment points on the support. The fine adjustment of the position or orientation of the display device can then be performed, as described above, via the adjusting device.

The support should be a component formed of a highly rigid material so that movement of the vehicle body in operation of the motor vehicle does not cause independent movements of the support that interfere with the proper operation of the display device, i.e. in particular a head-up display, or which make it more difficult to properly display the images to be displayed, in particular projected. The support is therefore advantageously formed of a highly rigid plastic material. The plastic material is advantageously reinforced with stiffness-increasing reinforcing fibers, in particular glass fibers. The plastic material may be, for example, glass fiber-reinforced polyphenylene sulfide (PPS) or polyamide (PA). The employed plastic material should be selected so as to also offer sufficient electrical insulation against leakage.

The retainer of the invention advantageously has two corresponding supports. The supports are adjacent to each other. This means that respective side surfaces of the support are parallel to each other. The embodiment of the retainer according to the invention with two supports increases the stability of support of the display device and is therefore advantageous. The two supports each have at least one corresponding bearing device with a position that can be adjusted relative to the support by way of a corresponding support-side adjusting device. Each support thus has at least one position-adjustable or height-adjustable bearing point for supporting the display device.

According to another advantageous embodiment of the invention, a three-point support of the display device is realized with the two supports, because an additional bearing point in addition to the bearing device is formed on one of two supports for supporting the display device. The additional bearing point is, unlike the two bearing devices, not adjustable relative to the support. Overall, in this embodiment, the retainer according to the invention has two bearing points, whose position or height relative to the supports is adjustable, formed by the bearing devices and one fixed bearing point.

BRIEF DESCRIPTION OF THE DRAWING

Further advantages, features and details of the invention result from the exemplary embodiments described below and from the drawings, in which:

FIGS. 9-11 show different views of a bearing device including an adjusting device of a retainer according to an exemplary embodiment of the invention.

DETAILED DESCRIPTION OF PREFERRED EMBODIMENTS

Figure 1:
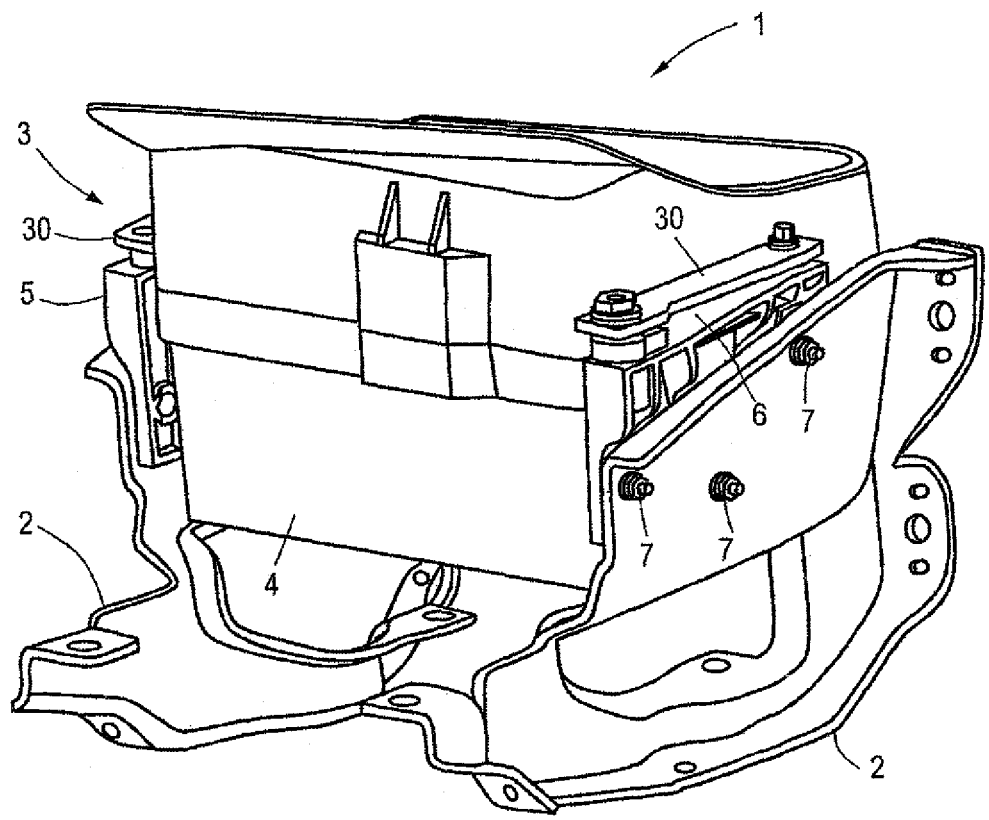
FIG. 1 shows a perspective view of a retainer according to an exemplary embodiment of the invention in a connected state with a vehicle body.

FIG. 1 shows, in a perspective view, a retainer 1 according to an exemplary embodiment of the invention when connected to a vehicle body indicated by the components 2. The retainer 1 is used for supporting or retaining a motor vehicle-side display device 3 in the form of a head-up display. The display device 3 is partially received in a housing 4. When in the following reference is made to the display device 3, the housing 4 is always included.

Two supports 5, 6 are associated with the retainer 1. The supports 5, 6 are connected with the components 2 by way of fastening means 7 in the form of screws or bolts, which each pass through respective through holes disposed in the supports 5, 6. The special arrangement of the support-side through holes enables a desired arrangement of the retainer 1 relative to the vehicle body in the sense of a pre-adjustment. The supports 5, 6 are formed of a highly rigid plastic material, i.e. for example a glass fiber-reinforced polyphenylene sulfide (PPS).

Figure 2:
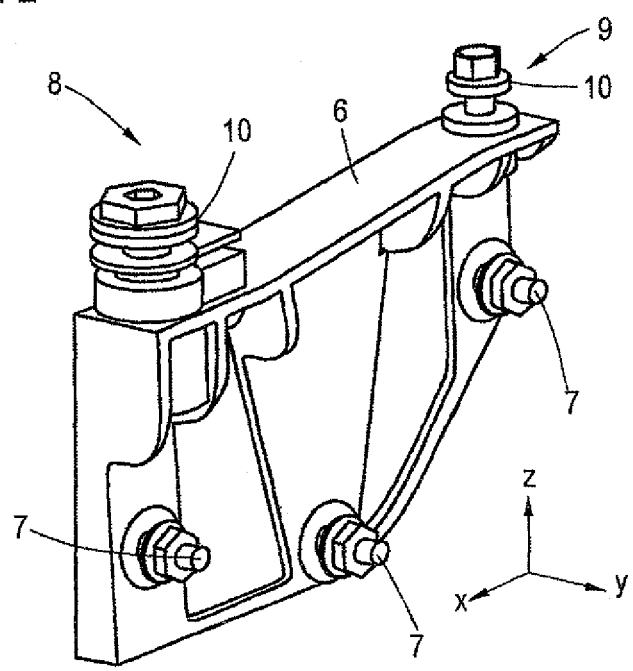
FIGS. 2-4 each show a perspective view of a support of a retainer according to an exemplary embodiment of the invention.
Figure 3:
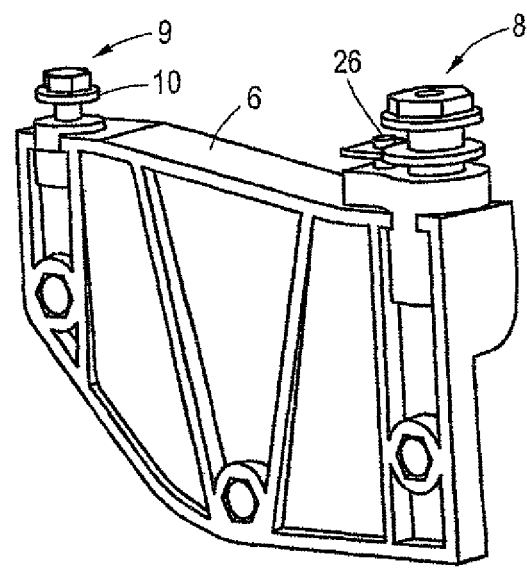
Figure 5:
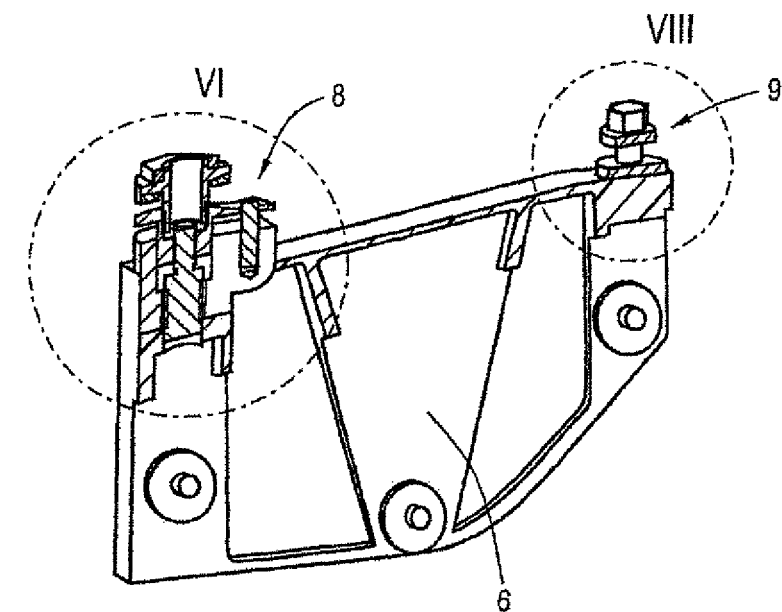
FIG. 5 shows a sectional view of a support of a retainer according to an exemplary embodiment of the invention.

FIGS. 2, 3 and 5 show the support 6 disposed in FIG. 1 to the right of the display device 3 or the housing 4, respectively. FIG. 2 is a view of the side of the support 6 facing away from the housing 4. FIG. 3 shows a view of the side of the support 6 facing the housing 4. The support 6 has two bearing positions or bearing points for the display device 2 and the housing 4 accommodating the display device 2, respectively. A front bearing position in FIGS. 2, 3 is formed by a bearing device 8. A rear bearing position in FIGS. 2, 3 is formed by an additional bearing position 9. The bearing device 8 and the bearing position 9 are each formed such that a side flange 30 (see FIG. 1) of the housing 4 can be attached thereto. The attachment of the side flange 30 of the housing 4 is realized in that corresponding parts of the bearing device 8 and the bearing position 9 engage through respective openings provided in the side flange 30 for this purpose. The housing 4 is connected to the support 6 via the bearing device 8 or on the bearing position 9. Both the support device 8 and the bearing position 9 are provided with corresponding spherical or dome-shaped washers 10, which reduce mechanical stresses generated during screwing.

Unlike the bearing position 9, the bearing position 8 enables the position and/or height adjustment of the housing 4 and thus of the display device 3. For this purpose, an adjusting device 11 cooperating with the support device 8 is associated with the retainer 1. The z-direction of the housing 4 can then be adjusted by the adjusting device 11. This is a fine adjustment, which enables high-precision adjustment of the z-position of the housing 4 and thus of the display device 3.

Figure 4:
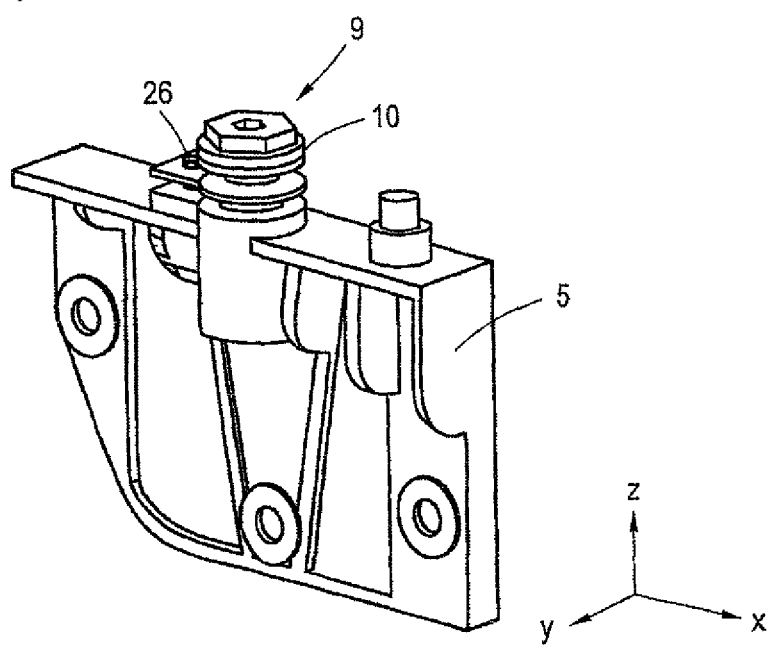

FIG. 4 shows the support 5 disposed in FIG. 1 to the left of the display device 3 and the housing 4, respectively. The support 5 is constructed similar to the support 6. The major difference between the supports 5, 6 is that the support 5 has only one bearing device 8, i.e. unlike the support 6, it does not have an additional bearing position 9.

The housing 4 and the display device 3 are thus supported at three bearing points (support device 8 and bearing position 9 on the support 6 and bearing device 8 on the support 5) forming a three-point bearing. An adjustment in the z-direction is possible both on the support 5 on the left-hand side of FIG. 1 as well as on the support 6 on the right-hand side of FIG. 1 via corresponding bearing devices 8. The housing 4 can then, in principle, also be tilted by performing the height adjustment only on one of the supports 5, 6.

Figure 6:
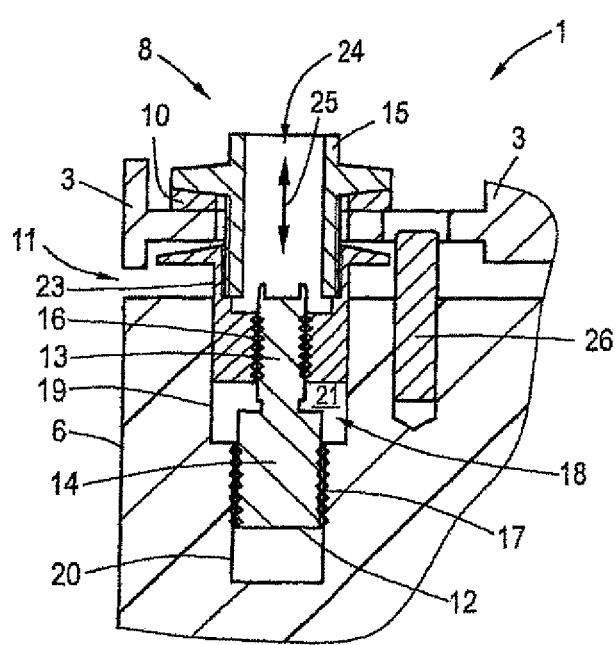
FIG. 6 shows an enlarged view of the detail VI shown in FIG. 5.
Figure 7:
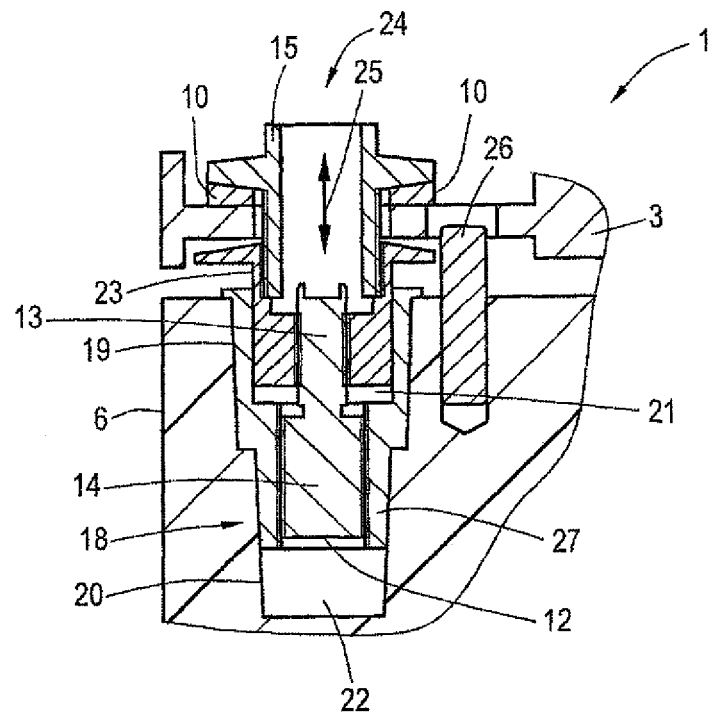
FIG. 7 shows in a variant an enlarged view of the detail VI shown in FIG. 5.

The precise construction of the bearing device 8 and the adjusting device 11, respectively, is evident from FIGS. 6, 7, which are each sectional views sectioned in a direction along the longitudinal axis of the supports 5, 6.

The adjusting device 11 includes a central elongated setting element 12 in the form of a cylindrical spindle. The setting element 12 includes two axially adjacent coupling segments 13, 14. A first coupling segment 13 at the top in FIG. 6, which in the assembled state of the support 6 is located further outward with respect to the top surface of the support 6, is used to couple of the setting element 12 with the support device 8, i.e. in particular a sleeve-shaped part 15 of the bearing device 8. As can be seen, the first coupling segment 13 is formed on a first diameter of the setting element 12. A second coupling segment 14 at the bottom in FIG. 6, which in the assembled state of the support 6 is located further inward with respect to the top surface of the support 6, is used to couple the setting element 12 with the support 6. As can be seen, the second coupling segment 14 is formed at a second diameter of the setting element 12. The first diameter of the setting element 12 is smaller than the second diameter of the setting element 12.

The first coupling segment 13 is provided with an external thread designated in the following as the first thread segment 16. The second coupling segment 14 is provided with an external thread designated in the following as a second thread segment 17. The two thread segments 16, 17 are formed on the respective coupling segments 13, 14 of the setting element 12 by applying a threaded insert. The threaded inserts are non-rotatably connected to the setting element 12, i.e. to the respective coupling segments 13, 14.

The setting element 12 is disposed in a receiving area 18 formed in the support 5 as a blind hole. The receiving section 18 is divided into two receiving area sections 19, 20. The two receiving area sections 19, 20 each define respective receiving spaces 21, 22. The two receiving area sections 19, 20 and hence the receiving spaces 21, 22 have different diameters. The first receiving area section 19 at the top in FIG. 6 has an inner diameter which corresponds to the outer diameter of a coupling part 23 axially inserted into the first receiving area section 19. The second receiving area section 18 at the bottom in FIG. 6 has an inner diameter which corresponds to the outer diameter of the second coupling segment 14 of the setting element 12.

The coupling part 23 is connected as an intermediary between the setting element 12 and the component 15 associated with the bearing device 8. The coupling part 23 is fixedly connected to the sleeve-shaped component 15 of the bearing device 8 so that, as will be explained below, axial movements of the coupling part 23 are transmitted directly to the sleeve-shaped component 15. The setting element 12 is thus indirectly connected via the coupling part 23 with the bearing device 8 and the sleeve-like component 15, respectively.

The sections of the coupling part 23 and of the second receiving area section 20, respectively, opposite the respective thread segments 16, 17 are provided with unspecified counter-threads. The coupling part 23 has accordingly a counter-thread segment adapted to the setting element-side first thread segment 16. The support-side second receiving area section 20 has accordingly a counter-thread segment adapted to the setting element-side second thread segment 17.

The adjusting member 12 not only has two different diameters, on which respective coupling segments 13, 14 are disposed. The thread segments 16, 17 formed on the respective coupling segments 13, 14 are different to the effect that the threads formed in the thread segments 16, 17 have different thread pitches.

The first coupling segment 13 of the setting element 12 is an M5 thread. The first coupling segment 13 hence has an outer diameter of 5 mm, and the first thread segment 16 has a thread pitch of 0.8 mm per revolution of the setting element 12 about its longitudinal axis. Conversely, the thread segment 17 formed on the second coupling segment 14 of the setting element 12 is an M8 thread. The second coupling segment 14 hence has an outer diameter of 8 mm, and the second thread segment 16 has a thread pitch of 1.25 mm per revolution of the setting element 12 about its longitudinal axis. The actual height adjustment of the setting element 12 per full revolution (360° rotation) and of the bearing device 8 coupled thereto via the coupling part 23 results from the difference between the respective thread pitches of the thread segments 16, 17. The difference between the thread pitches is here 0.45 mm per revolution. Accordingly, a full revolution of the setting element 12 allows a height adjustment of the bearing device 8 of 0.45 mm.

In principle, the first coupling segment 13 of the setting element 12 may also be configured other than an M5 thread, and the thread formed on the second coupling segment 14 of the setting element also need not be an M8 thread. However, it is important for the present invention that the two coupling segments 13, 14 and the thread segments 16, 17, respectively, formed thereon having different thread pitches.

As can be seen, a bore 24 axially aligned with the setting element 12 is located in the bearing device 8, i.e. in the sleeve-shaped component 15. A tool, for example a screwdriver, which engages with an exposed front side of the setting element 12 that has a screw head drive, can be inserted through the hole. Torques can thereby be transferred to the setting element 12 and the setting element 12 can be moved axially, i.e. in the z-direction, within the support 6 and the receiving area 18, respectively (see double arrow 25; FIGS. 9-11).

The coupling part 23 is non-rotatably connected to the support 6 so that rotations of the setting element 12 cannot be transmitted to the coupling part 23. The rotation-locked support of the coupling part 23 arises from the fact that a bolt 26 or pin projecting outward from the support 5 engages through an opening in a shoulder or flange projecting from the coupling part 23 in the longitudinal direction of the support 6 (see also FIG. 4). This produces a rotation-lock of the coupling part 23.

Because the coupling part 23 is non-rotatably connected to the support 6, the coupling part 23 is also pulled downward when the setting element 12 moves downward due to an axial movement caused by a rotation. The coupling part 23 is thereby tensioned, resulting in an arrangement or securement with a very stable orientation or position of the bearing device 8 in the z direction. In particular, self-locking can be realized in this way, i.e. the coupling part 23 is unable to change its z-position from a z-position that was set by a corresponding rotation of the setting element 12. This is a significant advantage for the highly sensitive adjustment of the position and orientation of head-up displays. Overall, a fine adjustment or readjustment of a desired position or orientation of a display device 3 in the form of a head-up display can be easily and quickly realized or, if necessary, performed at a later time.

The sectional view of the retainer 1 shown in FIG. 7 differs from the embodiment shown in FIG. 6 only in that the dimensions of the support-side receiving area 18 are not directly adapted to the external dimensions of the setting element 12 and the coupling part 23, respectively. It is evident that the inner diameter of the first receiving area section 19 is larger than the outer diameter of the coupling part 23. Likewise, the inner diameter of the second receiving area section 20 is greater than the outer diameter of the second coupling segment 14 of the setting element 12. To compensate for the differences in the respective inner and outer diameters, a sleeve element 27 is inserted in the blind hole forming the support-side receiving section 18. The sleeve element 27 is non-rotatably connected to the support 6, which may be implemented, for example, by gluing, welding, pressing etc. The sleeve element 27 has two outer diameters and two inner diameters, which are adapted to the respective inner diameters of the support-side receiving section 18 and the associated receiving area sections 19, 20, respectively, and to the outer diameters of the section of the coupling part 23 and of the setting element-side second coupling segment 14 protruding into the support-side receiving section 18. The sleeve element 27 may be formed of a metallic material, such as for example steel, or of a stable plastic material, such as for example polyamide.

Figure 8:
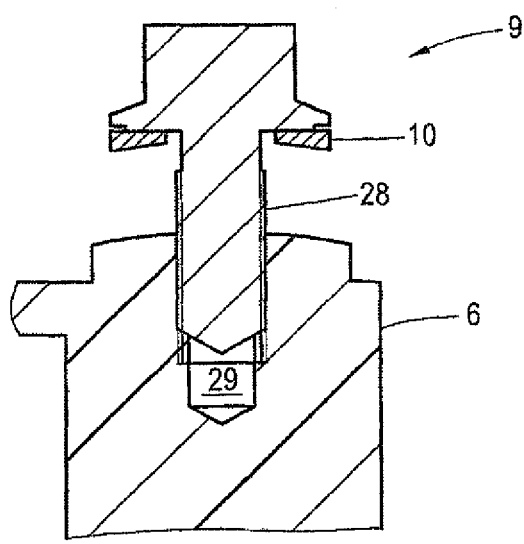
FIG. 8 shows an enlarged view of the detail VIII shown in FIG. 5.

FIG. 8 shows an enlarged view of the detail VIII shown in FIG. 5, from which the structure of the bearing position 9 becomes evident. The bearing position 9 is formed by a helical fastener 28 which engages with an axial extension in a support-side blind hole 29. A washer 10 is disposed at the bottom side of the head of the fastener 28 which is radially expanded in comparison to the axial projection. The side of the washer 10 facing away from the head is dome-shaped, i.e. rounded. Likewise, the surface section of the support 6 facing the washer 10 is dome-shaped in the area around the blind hole, i.e. rounded. In this way, mechanical stresses can be reduced when the display device 3 is attached. The bolt element 28 may also be inserted in a sleeve element (not shown) that is inserted in a corresponding support-side blind bore 29. The bolt element 28 and the sleeve element can form a common assembly that can be connected in combination to the support 6.

FIGS. 9-11 show various views of a bearing device 8 together with an adjusting device 11 of a retainer 1 according to an exemplary embodiment of the invention. In this case, the bearing device 8 shown in the z-position in FIG. 9 is then in a reference position. FIG. 10 shows a position of the bearing device 8 that is upwardly displaced with respect to the z-position shown in FIG. 9 by a certain z-amount, i.e. by about 1.5 mm, while FIG. 11 shows a position of the bearing device 8 that is downwardly displaced with respect to the z-position shown in FIG. 9 by a certain z-amount.

What is claimed is:

1. A retainer for retaining a display device in a motor vehicle, comprising: at least one support comprising at least one bearing device for supporting the display device; and a support-side adjusting device configured to adjust a position of the bearing device relative to the at least one support, said support-side adjusting device comprising a setting element having a position that is adjustable relative to the support, a first coupling segment with a first thread segment disposed on its circumference for coupling to the bearing device, and a second coupling segment with a second thread segment disposed on its circumference for coupling with the at least one support, with the first thread segment and the second thread segment having different thread pitches, wherein the setting element is constructed as a spindle, wherein the first coupling segment and the second coupling segment have different diameters, and wherein a diameter of the first coupling segment is smaller than a diameter of the second coupling segment, and wherein the at least one support is constructed of a plastic material and the plastic material comprises reinforcing fibers, and wherein the at least one bearing device is non-rotatably supported and the first thread segment engages directly in a part of the at least one bearing device that comprises a counter-thread segment corresponding to the first thread segment, or wherein a coupling part is non-rotatably supported and the first thread segment engages in a part of the coupling part that supports the at least one bearing device and comprises a counter-thread segment corresponding to the first thread segment and is disposed between the first coupling segment and a part of the bearing device; and wherein said coupling part comprises a sleeve part fitted within said coupling part.

2. The retainer of claim 1, wherein at least one of the first and second thread segment is formed by a threaded insert that clampingly surrounds the respective first or second coupling segment.

3. The retainer of claim 1, wherein the at least one support comprises a receiving area formed in the support for the setting element, wherein the first coupling segment of the setting element is disposed in a first receiving area section having a first diameter and the second coupling segment of the setting element is disposed in a second receiving area section having a second diameter.

4. The retainer of claim 1, wherein the first thread segment engages in a cylindrical receiving space of the coupling part, with the cylindrical receiving space of the coupling part having a diameter that corresponds to the diameter of the first coupling segment and a counter-thread segment corresponding to the first thread segment, and wherein the second thread segment engages in a corresponding cylindrical receiving space of the support, with the cylindrical receiving space of the support having a diameter that corresponds to the diameter of the second coupling segment and a counter-thread segment corresponding to the second thread segment.

5. The retainer of claim 1, wherein the support comprises a receiving area with a first receiving area section having a first diameter for the coupling part and a second receiving area section having a second diameter for the setting element.

6. The retainer of claim 1, wherein the at least one bearing device comprises has a bore providing access to an exposed end face of the setting element.

7. The retainer of claim 1, wherein the at least one support has at least one connecting point for connecting the at least one support to a vehicle body.

8. The retainer of claim 7, wherein the at least one support has three connecting points.

9. The retainer of claim 7, wherein the at least one connecting point is shaped as a through-hole.

10. The retainer of claim 1, comprising at least two supports, wherein at least one of the at least two supports has at least one bearing device.

11. The retainer of claim 10, comprising at least two supports, wherein the at least two supports have each at least one bearing device.

12. The retainer of claim 10, wherein a first support of the at least two supports has a corresponding bearing device and an additional bearing point for supporting the display device, whereas a second support of the at least two supports has only a corresponding bearing device.

13. The retainer of claim 1, wherein the display device is retained in a motor vehicle-side fitting.

14. The retainer of claim 1, wherein the display device forms a part of a head-up display.

* * * * *